United States Patent
Anderson et al.

(12) 
(10) Patent No.: US 6,338,119 B1
(45) Date of Patent: Jan. 8, 2002

(54) METHOD AND APPARATUS WITH PAGE BUFFER AND I/O PAGE KILL DEFINITION FOR IMPROVED DMA AND L1/L2 CACHE PERFORMANCE

(75) Inventors: Gary Dean Anderson; Ronald Xavier Arroyo; Bradly George Frey; Guy Lynn Guthrie, all of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/282,631

(22) Filed: Mar. 31, 1999

(51) Int. Cl.⁷ .......................... G06F 13/00; G06F 13/28
(52) U.S. Cl. ................... 711/135; 711/138; 711/139; 711/144; 711/146; 711/141; 710/22
(58) Field of Search .......................... 711/141, 144, 711/145, 146, 135, 138, 139, 209; 710/52, 22, 24, 26, 27

(56) References Cited

U.S. PATENT DOCUMENTS

| | | | |
|---|---|---|---|
| 4,885,680 A | * 12/1989 | Anthony et al. | 711/144 |
| 5,884,100 A | * 3/1999 | Normoyle et al. | 710/52 |
| 5,953,538 A | * 9/1999 | Duncan et al. | 710/22 |
| 6,003,106 A | * 12/1999 | Fields, Jr. et al. | 710/129 |
| 6,128,711 A | * 10/2000 | Duncan et al. | 711/155 |
| 6,173,383 B1 | * 1/2001 | Casamatta | 711/202 |

* cited by examiner

*Primary Examiner*—Glenn Gossage
(74) *Attorney, Agent, or Firm*—Casimer K. Salys; Bracewell & Patterson L.L.P.

(57) ABSTRACT

A method and apparatus for improving direct memory access and cache performance utilizing a special Input/Output or "I/O" page, defined as having a large size (e.g., 4 Kilobytes or 4 Kb), but with distinctive cache line characteristics. For Direct Memory Access (DMA) reads, the first cache line in the I/O page may be accessed, by a Peripheral Component Interconnect (PCI) Host Bridge, as a cacheable read and all other lines are non-cacheable access (DMA Read with no intent to cache). For DMA writes, the PCI Host Bridge accesses all cache lines as cacheable. The PCI Host Bridge maintains a cache snoop granularity of the I/O page size for data, which means that if the Host Bridge detects a store (invalidate) type system bus operation on any cache line within an I/O page, cached data within that page is invalidated, the Level 1 and Level 2 ((L1/L2) caches continue to treat all cache lines in this page as cacheable). By defining the first line as cacheable, only one cache line need be invalidated on the system bus by the L1/L2 cache in order to cause invalidation of the whole page of data in the PCI Host Bridge. All stores to the other cache lines in the I/O Page can occur directly in the L1/L2 cache without system bus operations, since these lines have been left in the 'modified' state in the L1/L2 cache.

9 Claims, 4 Drawing Sheets

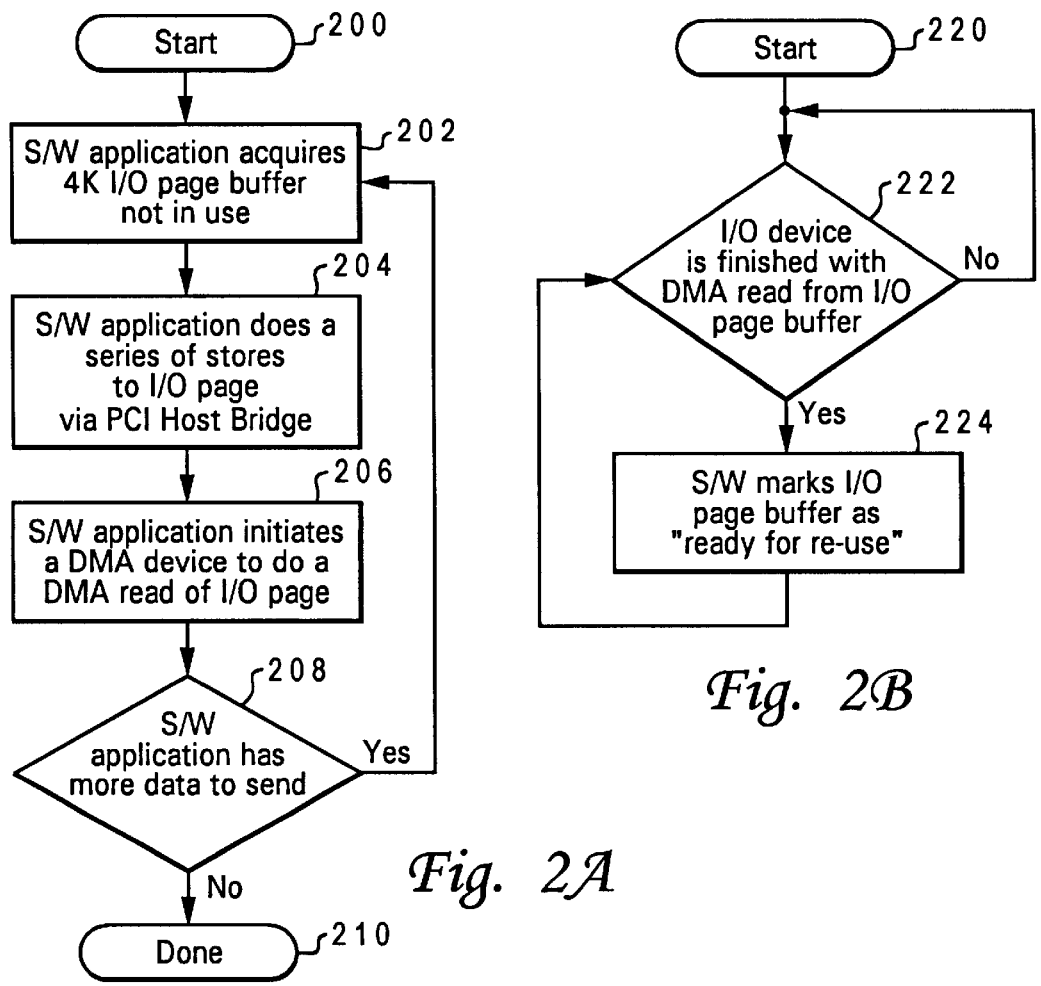
Fig. 2A
Fig. 2B
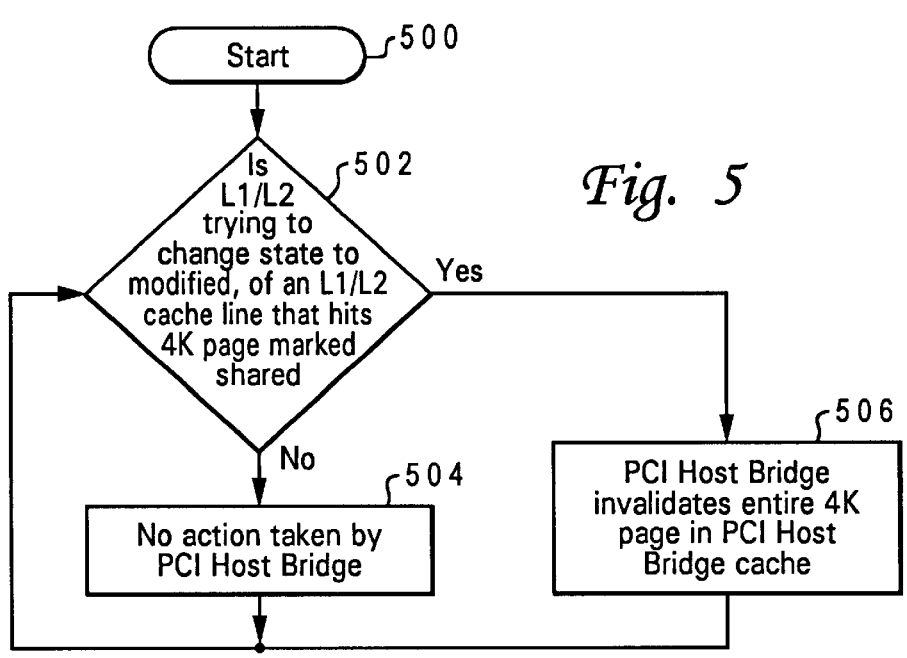
Fig. 5

METHOD AND APPARATUS WITH PAGE BUFFER AND I/O PAGE KILL DEFINITION FOR IMPROVED DMA AND L1/L2 CACHE PERFORMANCE

FIELD OF THE INVENTION

The present invention relates in general to data processing systems and in particular to processing systems which pre-fetch data from a main memory and one or more cache memories. More particularly, the present invention relates to improving performance of direct memory access and cache memory.

DESCRIPTION OF THE PRIOR ART

In modem microprocessor systems, processor cycle time continues to decrease as technology continues to improve. Also, design techniques of speculative execution, deeper pipelines, more execution elements and the like, continue to improve the performance of processing systems. The improved performance puts a heavier burden on the system's memory interface since the processor demands data and instructions more rapidly from memory. To increase the performance of processing systems, cache memory systems arc often implemented.

Processing systems employing cache memories are well known in the art. Cache memories are very high-speed memory devices that increase the speed of a data processing system by making current programs and data available to a control processor unit ("CPU") with a minimal amount of latency. Large on-chip caches (Level 1 or L1 caches) are implemented to help reduce memory latency, and they are often augmented by larger off-chip caches (Level 2 or L2 caches). The cache serves as a storage area for cache line data. Cache memory is typically divided into "lines" with each line having an associated "tag" and attribute bits. The lines in cache memory contain copies of data from main memory. For instance, a "4K page" of data in cache may be defined as comprising 32 lines of data from memory having 128 bytes in each line.

The primary advantage behind cache memory systems is that by keeping the most frequently accessed instructions and data in the fast cache memory, the average memory access time of the overall processing system will approach the access time of the cache. Although cache memory is only a small fraction of the size of main memory, a large fraction of memory requests are successfully found in the fast cache memory because of the "locality of reference" property of programs. This property holds that memory references are confined to a few localized areas of memory (in this instance, the L1 and L2 caches, herein after referred to as the "L1/L2" cache).

The basic operation of cache memories is well-known. When the processor needs to access memory, the cache is examined. If the word addressed by the processor is found in the cache, it is read from the fast cache memory. If the word addressed by the processor is not found in the cache, the main memory is accessed to read the word. A block of words containing the word being accessed is then transferred from main memory to cache memory. In this manner, additional data is transferred to cache (pre-fetched) so that future references to memory will likely find the required words in the fast cache memory.

Pre-fetching techniques are often implemented to supply memory data to the on-chip L1 cache ahead of time to reduce latency. Ideally, data and instructions are pre-fetched far enough in advance so that a copy of the instructions and data is always in the L1 cache when the processor needs it. Pre-fetching of instructions and/or data is well-known in the art.

In a system which requires high Input/Output (I/O) Direct Memory Access (DMA) performance (i.e., graphics), a typical management of system memory data destined for I/O may be as follows:

1) A system processor produces data by doing a series of stores into a set of 4 Kilobyte (4K) page buffers in system memory space. This causes the data to be marked as 'modified' (valid in the cache, not written back to system memory) in the L1/L2 cache.
2) The processor initiates an I/O device to perform a DMA Read to these 4K pages as they are produced.
3) The I/O device does a series of DMA reads into system memory.
4) A Peripheral Component Interconnect or PCI Host bridge, which performs DMA operations on behalf of the I/O device, pre-fetches and caches data in a 'shared' (valid in cache, valid in system memory) state. The L1/L2 caches changes each data cache line from the 'modified' state to the 'shared' state as the PCI Host Bridge reads the data (i.e., the L1/L2 caches intervene and either supplies the data directly or 'pushes' it to memory where it can be read).
5) When the DMA device finishes, the 4K buffer is re-used (i.e., software has a fixed set of buffers that the data circulates through).

In order to maintain DMA I/O performance, a PCI Host Bridge may contain its own cache which it uses to pre-fetch/cache data in the shared state. This allows DMA data to be moved close to the data consumer (i.e., an I/O device) to maximize DMA Read performance. When the PCI Host Bridge issues a cacheable read on the system bus, this causes the L1/L2 cache to go from the 'modified' to the 'shared' state due to the PCI host bridge performing a cacheable read. This state changing action produces a performance penalty when the software wants to re-use this 4K page cache space to store the new DMA data since every line in the L1/L2 cache has been changed to the 'shared' state. In order for the new stores to take place, the L1/L2 cache has to perform a system bus command for each line to indicate that the line is being taken from 'shared' to 'modified.' This must occur for each cache line (there are 32) in the 4K page even though the old data is of no use (the PCI Host Bridge needs an indication that its data is now invalid). The added memory coherency traffic, 32 system bus commands, that must be done on the system bus to change the state of all these cache lines to 'modified' before the new store may be executed can degrade processor performance significantly.

It has been shown that stores to a 4K page by the processor may take 4–5 times longer when the L1/L2 cache is in the 'shared' state as opposed to being in the 'modified' state. This is due to added coherency traffic needed on the system bus to change the state of each cache line to 'modified'

It would be desirable to provide a method and apparatus that increase the speed and efficiency of a Direct Memory Access device. It would also be desirable to provide a method and apparatus to reduce the number of system bus commands required to change state of a page of data in the L1/L2 cache.

SUMMARY OF THE INVENTION

It is therefore one object of the present invention to provide a method and apparatus that will reduce the number of system bus commands required to change the state of a buffer in an L1/L2 cache.

It is another object of the present invention to provide a method and apparatus that will increase the speed and efficiency of Direct Memory Access (DMA)devices.

It is yet another object of the present invention to provide a method and apparatus that allow a cache to clear a memory buffer with one bus operation.

The foregoing objects are achieved as is now described. A method and system for improving direct memory access and cache performance utilizing a special Input/Output or 'I/O' page is defined as having a large size (e.g., 4 Kilobytes), but with distinctive cache line characteristics. For DMA reads, the first cache line in the I/O page may be accessed, by a PCI Host Bridge, as a cacheable read and all other lines are non-cacheable access (DMA Read with no intent to cache). For DMA writes, the PCI Host Bridge accesses all cache lines as cacheable. The PCI Host Bridge maintains a cache snoop granularity of the I/O page size for data, which means that if the Host Bridge detects a store (invalidate) type system bus operation on any cache line within an I/O page, cached data within that page is invalidated (L1/L2 caches continue to treat all cache lines in this page as cacheable). By defining the first line as cacheable, only one cache line need be invalidated on the system bus by the L1/L2 cache in order to cause invalidation or "killing" of the whole page of data in the PCI Host Bridge. All stores to the other cache lines in the I/O Page can occur directly in the L1/L2 cache without system bus operations, since these lines have been left in the 'modified' state in the L1/L2 cache.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

FIG. 2A is a high-level flow diagram of a method for utilizing a special DMA I/O page in accordance with a preferred embodiment of the present invention;

FIG. 2B depicts a high-level flow diagram of the method for re-using a special DMA I/O page in accordance with a preferred embodiment of the present invention;

FIG. 5 is a high level flow diagram of a portion of a method for utilizing a special DMA I/O page wherein a PCI Host Bridge may snoop System Bus coherency, in accordance with a preferred embodiment of the present invention.

DESCRIPTION OF THE PREFERRED EMBODIMENT

Figure 1:
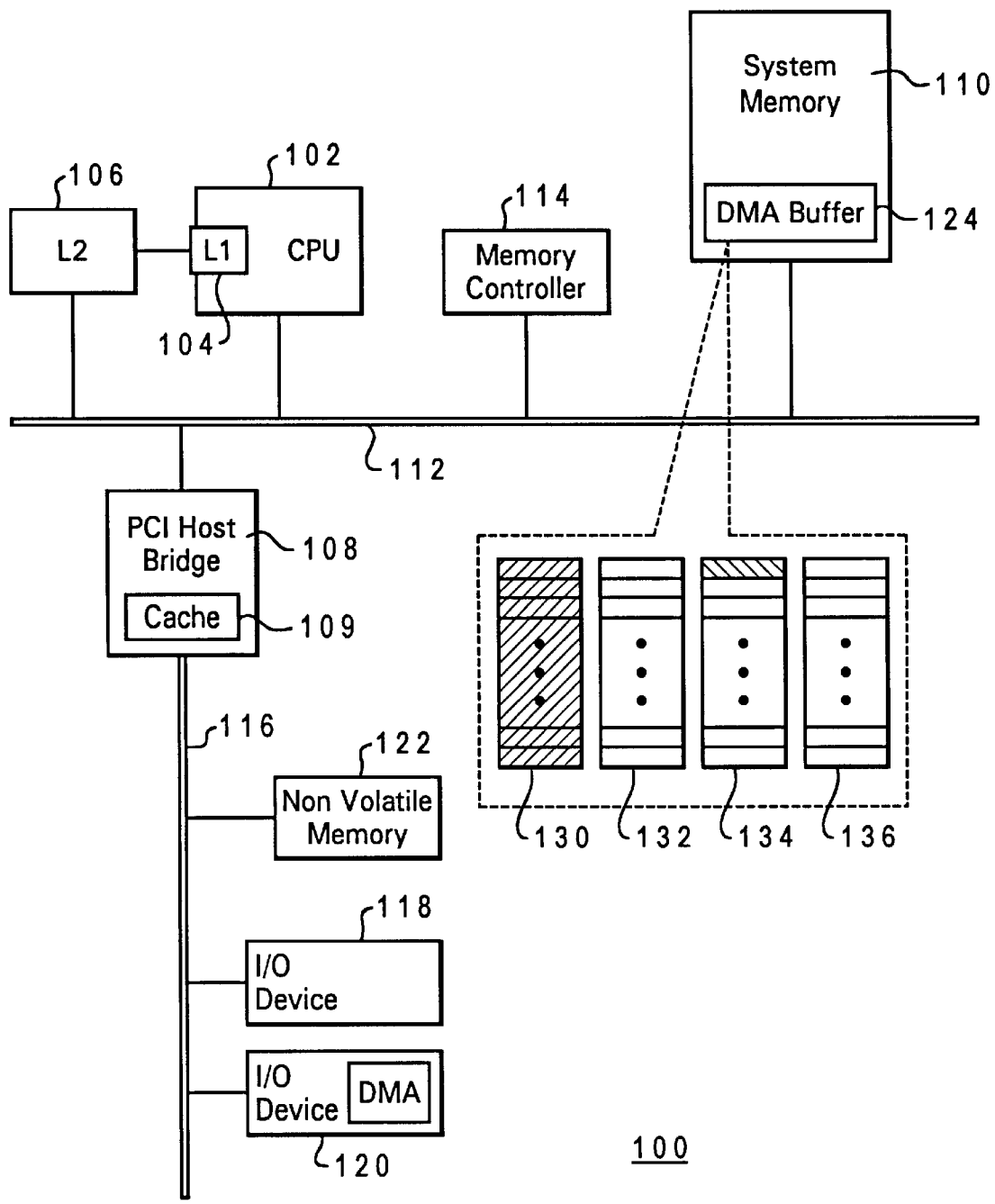
FIG. 1 depicts a high-level block diagram of a data processing system in which a preferred embodiment of the present invention may be implemented.

With reference now to the figures, and in particular with reference to FIG. 1, a multiprocessor data processing system in accordance with a preferred embodiment of the present invention is depicted. Data processing system 100 is a symmetric multi-processor (SMP) system (only one processor 102 shown), which preferably comprise one of the PowerPC™ family of processors available from International Business Machines (IBM) of Armonk, N.Y. Although only one processor is depicted in the exemplary embodiment, those skilled in the art will appreciate that additional processors may be utilized in a multiprocessor data processing system in accordance with the present invention.

Processor 102 includes a level one (L1) cache 104. In order to minimize data access latency, one or more additional levels of cache memory may be implemented within data processing system 100, such as a level two (L2) cache 106. The lower cache level, L2, are employed to stage data to the L1 cache and typically have progressively larger storage capacities but longer access latencies. For example, L1 cache 104 may have a storage capacity of 32 kilobytes and an access latency of approximately 1–2 processor cycles. L2 cache 106 might have a storage capacity of 512 kilobytes but an access latency of 5 processor cycles. L2 cache 106 serves as intermediate storage between processor 102 and system memory 110 which typically has a much larger storage capacity but may have an access latency of greater than 50 processor cycles.

Both the number of levels in the cache hierarchy and the cache hierarchy configuration employed in data processing system 100 may vary. L2 cache 106 is a dedicated cache connected between CPU 102 and system memory 110 (via system bus 112). Those skilled in the art will recognize that various permutations of levels and configurations depicted may be implemented.

L2 cache 106 is connected to system memory 110 via system bus 112. Also connected to system bus 112 is a memory controller 114 and PCI host bridge 108. Memory controller 114 regulates access to system memory 110. Software can organize, within system memory 110, buffer regions that are utilized by DMA buffer 124 (e.g., DMA buffer 124 may be a set of 4 k page buffers in system memory 110 space). PCI host bridge 108 connects system bus 112 to PCI I/O bus 116, which provides connections for I/O devices such as a graphics adapter providing a connection for a display (not shown), I/O devices 118 and 120. System bus 112, PCI host bridge 108, and PCI I/O bus 116 thus form an interconnect coupling the attached devices, for which alternative implementations are known in the art.

An input/output (I/O) subsystem typically is made up of I/O bus 116, such as a Peripheral Component Interconnect (PCI) bus, to which is attached several I/O devices 118 and 120 along with PCI host bridge (PCIHB) 108. I/O bus 116 is used to connect one or more I/O devices to system bus 112 via PCIHB 108 and allows I/O devices 118 and 120 to transfer commands and data to/from system memory 110 via PCIHB 108.

PCIHB 108 may pass processor commands from system bus 112 to I/O bus 116 when processor 102 wants to access I/O devices 118 and 120. Additionally, PCIHB 108 may also pass direct memory accesses (DMAs) from I/O bus 116 initiated by I/O devices 118 and 120 to system memory 110. For DMA access, PCIHB 108 may pre-fetch and cache data to help improve DMA performance. PCIHB 108 behaves very much like processor 102 on system bus 112 in issuing system bus commands to access system memory 110 and to maintain coherency across L1/L2 caches 104 and 106 as well as its own cache 109.

An I/O Master Device is a device that may initiate a DMA on I/O bus 116 which transfers data from system memory 110 to some other location (and vice versa) via PCIHB 108. In this block diagram, I/O device 120 represents an I/O Master Device capable of transferring data to and from system memory 110. These types of transfers may be done without intervention by processor 102.

I/O devices 118 and 120 may comprise conventional peripheral devices including a graphical pointing device such as a mouse or trackball, a display, and a printer, all of which may be interfaced to PCI bus 116 via conventional adapters. Non-volatile memory 122 may comprise a hard disk drive and stores an operating system and other software controlling operation of system 100, which are loaded into volatile system memory 110 in response to system 100 being powered on. Those skilled in the art will recognize that data processing system 100 may include many additional components not shown in FIG. 1, such as serial and parallel ports, connections to networks or attached devices, etc. Such modifications and variations are within the spirit and scope of the present invention.

Within DMA buffer 124, data may be stored in, for instance, 4K page buffers 130 and 132 within 32 lines of data of 128 bytes each. Before L1/L2 cache 102 and 104 can execute a store from processor 102 to a line that is in the shared state in the L1/L2 cache, a separate system bus operation is required in order to inform the other caches to invalidate each cache's copy. Since this is done for each cache line, the processor is slowed down due to the number of repetitive bus operations to clear one page buffer to make room for new data. The present invention sets up a 4K page buffer (I/O) so that the buffer may be cleared in one bus operation instead of 32 bus operations.

Typical 4K page buffers are represented by buffers 130 and 132. 4K I/O page buffers, from the present invention, are represented by buffers 134 and 136. Lines of data within the buffers are represented by the blocks within the buffers and a crosshatch within a block represents a shared state. In buffer 130 all the cache lines are shared after the DMA access completes, requiring individual system bus operations for each cache line (32 lines) before the buffer may be cleared. Buffer 132 cache lines are shown as modified allowing data to be written to buffer 132. I/O buffer's 134 first cache line is in a shared state with the remaining lines in a modified state after the DMA access completes as required by the present invention. All cache lines in I/O buffer 136 are in a modified state. In contrast to converting the coherency state of buffer 130 to that of buffer 132, the conversion of the coherency state of buffer 134 to that of buffer 136 requires only the first line in I/O buffer 134 to be changed in order to allow data to be stored to I/O buffer 134. In comparison, converting an I/O page buffer (which only takes one line to change) state would take magnitudes less time than clearing a typical buffer (which requires changing 32 lines to change state).

Referring to FIG. 2A, a high-level flow diagram of a method for utilizing a special DMA I/O page in accordance with a preferred embodiment of the present invention, is illustrated. The process begins with step 202, which depicts a software application acquiring a 4K I/O page, currently not in use, to create data for a PCI I/O device to read later. The process next passes to step 204, which illustrates the software application accomplishing a series of stores to the 4K I/O page, where at least one of the stores is to the first cache line in the 4K I/O page. The process continues to step 206, which depicts the software application initiating a DMA device to perform a DMA Read of the 4K I/O page via the PCI Host Bridge, where at least one of the reads is to the first cache line in the 4K I/O Page. The process next passes to step 208, which illustrates a determination of whether the software application has more data to send. If not, the process is complete. If there is more data to send, the process instead returns to step 202 wherein the software application acquires a 4K I/O Page buffer not in use.

Referring now to FIG. 2B, a high-level flow diagram of the method for re-using the special DMA I/O page in accordance with a preferred embodiment of the present invention is depicted. The process begins with step 222, which depicts a determination of whether an I/O device has completed a DMA read from an I/O page buffer. If not, the process returns to step 222 and repeats the step. If the I/O device has completed a DMA read from the I/O Page buffer, the process instead passes to step 224, which illustrates software marking the I/O Page buffer as "ready for re-use by the software application." The process then returns to step 222 and determines whether an I/O device is finished with a DMA read to an I/O Page buffer.

Figure 3:
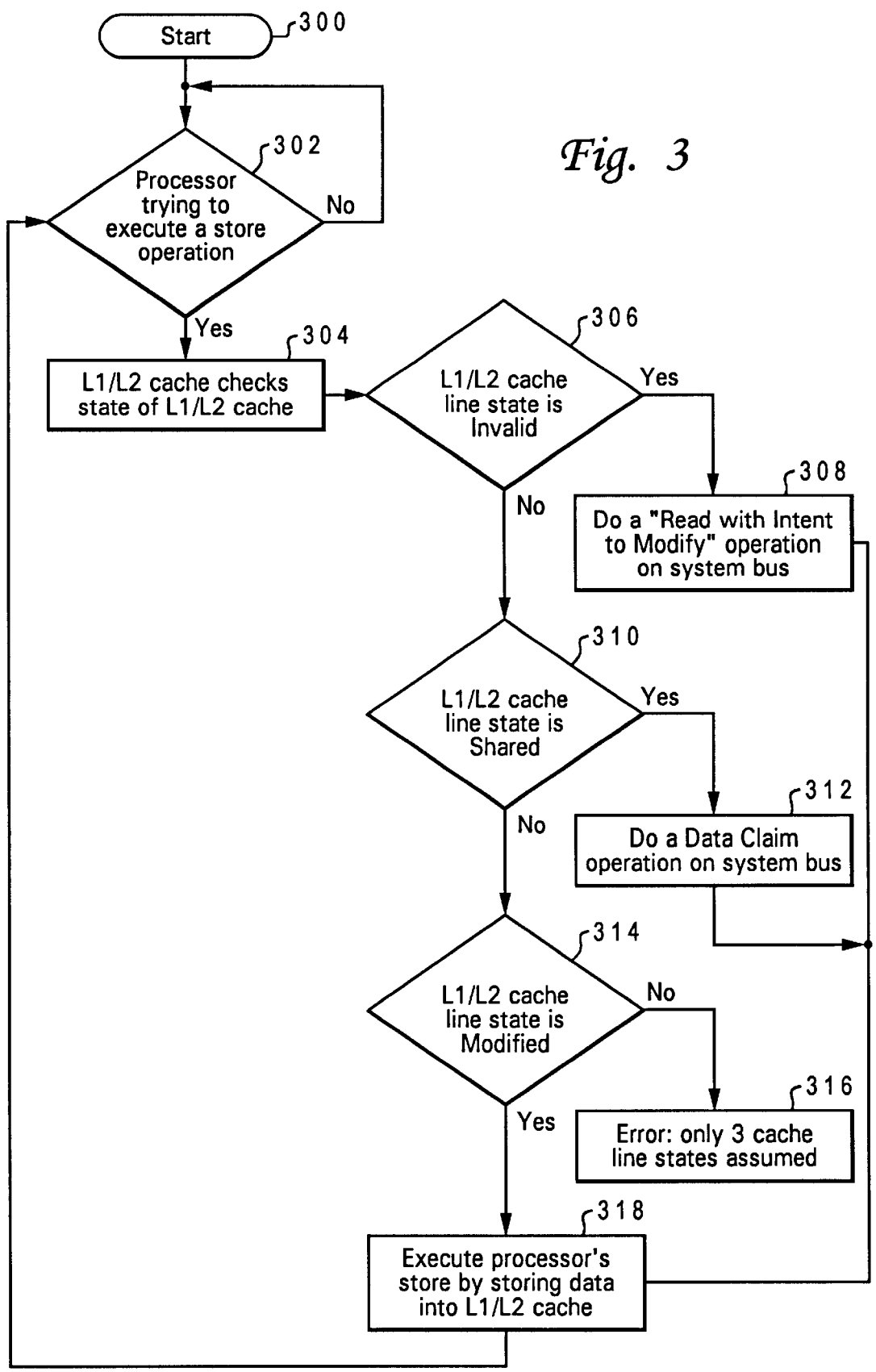
FIG. 3 is a flow diagram for an L1/L2 coherency procedure for performing processor store operations in accordance with a preferred embodiment of the present invention.

Referring to FIG. 3, a high-level flow diagram for an L1/L2 coherency process for performing processor stores in accordance with a preferred embodiment of the present invention, is illustrated. The process begins with step 300, which depicts starting the procedure. The process proceeds to step 302, which illustrates a determination of whether a processor is attempting to execute a store operation. If not, the process returns to step 302 and repeats the step. If the processor is trying to execute a store operation, the process passes instead to step 304, which depicts the L1/L2 cache checking the state of the L1/L2 cache before permitting the store to complete. The process then passes to step 306, which illustrates a determination of whether the L1/L2 cache line state is 'Invalid'. If the cache is 'Invalid', the process proceeds to step 308, which depicts an instruction issued to perform a 'Read with Intent to Modify' operation on the system bus to read a copy of the cache line and change the line to the 'Modified' state. The process then proceeds to step 318, which illustrates the processor's store instruction being executed by storing data into the L1/L2 cache.

Returning to step 306, if the L1/L2 cache line state is not 'Invalid', the process proceeds to step 310, which depicts a determination of whether the L1/L2 cache line state is 'shared'. If the cache line is 'shared', the process proceeds to step 312, which illustrates a 'data claim' operation being executed on the system bus in order to gain ownership of the line and change the line to a 'modified' state. The process then passes to step 318 where the processor's store instruction is executed by storing data into the L1/L2 cache. If, instead, the L1/L2 cache line state is not 'shared', the process proceeds to step 314, which depicts a determination of whether the L1/L2 cache line state is 'modified'. If the cache line is not modified, the process passes to step 316, which illustrates generation of an error message, since there are assumed to be only 3 L1/L2 cache line states.

Returning to step 314, if the L1/L2 cache line state is 'Modified', the process passes instead to step 318, which depicts the processor's store instruction being executed by storing data into the L1/L2 cache. The process then proceeds to step 302, which illustrates the processor attempting to execute another store instruction.

Figure 4:
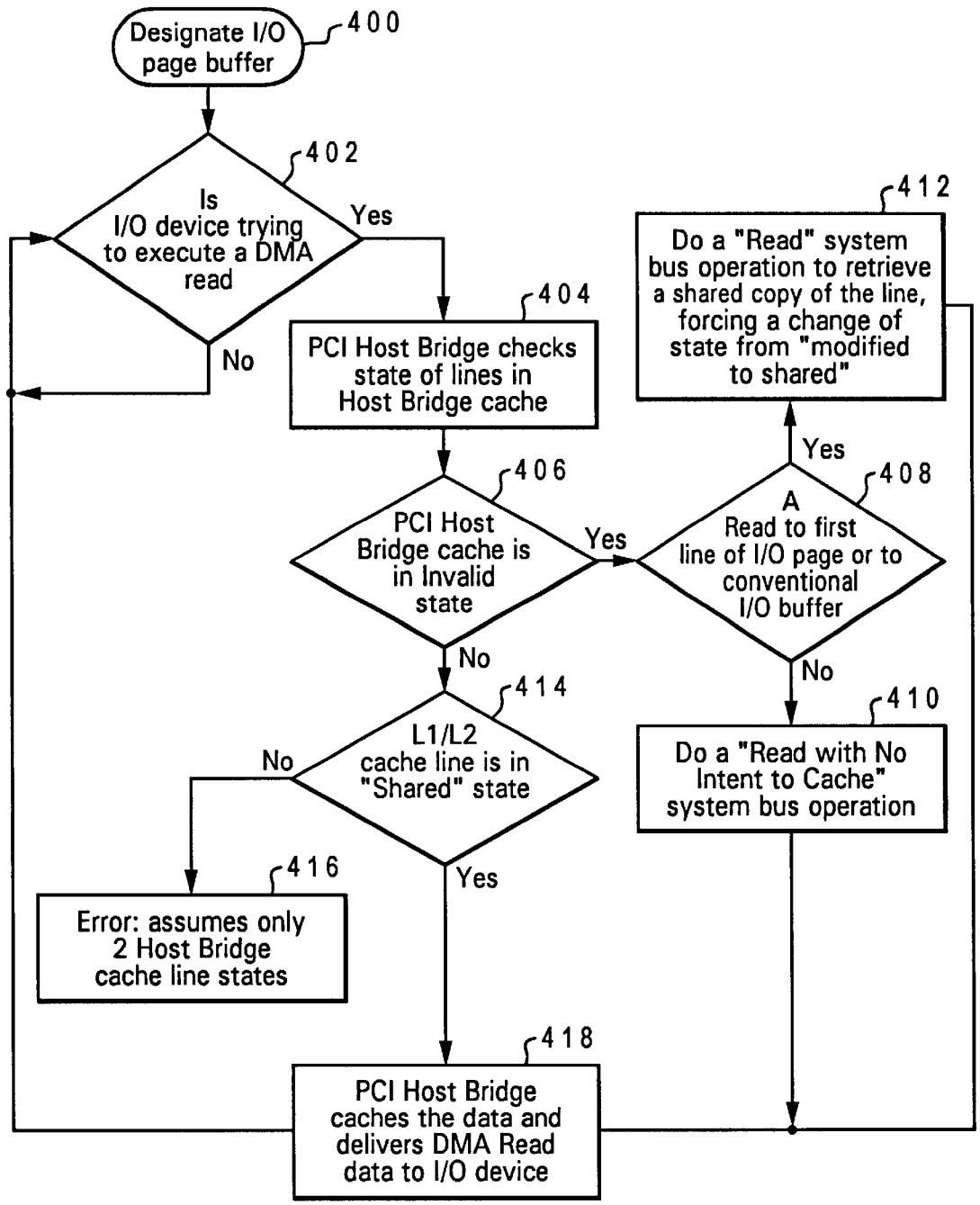
FIG. 4 depicts a high-level flow diagram of the method for utilizing a special DMA I/O page wherein a PCI Host Bridge may service DMA requests in accordance with a preferred embodiment of the present invention.

Referring to FIG. 4, a high-level flow diagram of the method for utilizing a special DMA I/O page, wherein a PCI Host Bridge may service DMA requests in accordance with a preferred embodiment of the present invention, is illustrated. The process begins with step 400, which depicts the I/O page buffer being designated. The step proceeds to step 402, which illustrates a determination of whether an I/O device is trying to execute a DMA read. If not, the process returns to step 402, and repeats until a DMA read is determined. If an I/O device is attempting to execute a DMA read, the process proceeds instead to step 404, which depicts the PCI Host Bridge checking the state of lines in the Host Bridge cache. Next the process passes to step 406, which illustrates a determination of whether the PCI Host Bridge cache is in the 'Invalid' state. If the cache is in the 'Invalid' state, the process proceeds to step 408, which depicts a determination of whether the DMA read to the I/O page is a read of the first cache line of the I/O page or a read of a conventional I/O buffer (not an I/O page). If the read is a read of the first cache line of an I/O Page or any cache line in a conventional I/O buffer, the process passes to step 412, which illustrates a 'Read' system bus operation being executed to retrieve a shared copy of the line. The L1/L2 cache is forced to change the state of the line from 'modified' to 'shared'. The process then proceeds to step 418, which depicts the PCI Host Bridge cacheing data and delivering the DMA read to the I/O device.

Returning to step 408, if the read is of an I/O Page, but not to the first cache line in the page, the process passes instead to step 410, which illustrates a 'Read with No Intent to Cache' system bus operation to retrieve a shared copy of the line. The L1/L2 cache may keep the cache line in a 'modified' state. The process then passes to step 418, which depicts the PCI Host Bridge cacheing data and delivering DMA read data to the I/O device.

Returning now to step 406, if the PCI Host Bridge cache is not in the 'Invalid' state, the process instead passes to step 414, which illustrates a determination of whether the L1/L2 cache line is in the 'shared' state. If the cache line is not in the 'shared' state, the process proceeds to step 416, which depicts generation of an error message since there are assumed to be only two PCI Host Bridge cache line states. Returning to step 414, if the L1/L2 cache line is in the shared state, the process proceeds to step 418, which illustrates the PCI Host Bridge cacheing data and delivering the DMA Read data to the I/O device. The process continues to step 402, which illustrates an I/O device attempting to execute a DMA read to an I/O page.

To manage the coherence of the 'I/O pages' the PCI Host Bridge is triggered to invalidate a 4K 'I/O page' by storing to the first cache line of the page before the 4K 'I/O page' can be re-used. The PCI Host Bridge treats the first cache line as special on DMA reads because the first line is devised to appear as a cacheable read to L1/L2 caches. The L1/L2 cache does a system bus coherency access indicating the processor's intentions to change the first cache line from 'shared' to 'modified'. The PCI Host Bridge is snooping on a 4K page granularity (size) so when a store occurs to the first cache line of a 4K page, the PCI Host Bridge will invalidate or "kill" the entire page, avoiding all the system bus traffic required to invalidate every cache line in the 4K page.

Referring now to FIG. 5, a high level flow diagram of the I/O page invalidation portion of the method for utilizing a special DMA I/O page wherein the PCI Host Bridge may snoop System Bus coherency, in accordance with a preferred embodiment of the present invention is depicted. The process begins with step 500, which depicts beginning the invalidation procedure. The process proceeds to step 502, which illustrates a determination of whether the L1/L2 cache is trying to perform a system bus operation that will change the state of an L1/L2 cache line that hits a 4K I/O Page marked 'shared' by the PCI Host Bridge. If not, the process passes to step 504, which depicts no action being taken by the PCI Host Bridge. The process continues to step 502 and repeats. Returning to step 502, if the L1/L2 cache is trying to perform a system bus operation that will change the state of an L1/L2 cache line that hits a 4K I/O page marked "Shared" by the PCI Host Bridge, the process instead passes to step 506, which illustrates the PCI Host Bridge invalidating the subject 4K page (e.g., I/O page) of data in the PCI Host Bridge cache, since the page was marked 'shared'.

By defining only the first cache line in a 4K I/O page to be read as cacheable, the L1 cache will still have all but the first cache line in the 'modified' state when it attempts to re-use the 4K buffer. Only the first line will be in the 'shared' state when the DMA is performed. Software will store to the first cache line in the I/O page whenever it is going to re-use a page so that the PCI Host Bridge is aware that it should invalidate the page. A DMA read or DMA write to the first cache line of an I/O page causes the L1/L2 cache to change the first cache line from 'modified' to 'shared'.

This I/O page, as defined according to a preferred embodiment of the present invention, greatly improves the performance of the processor when it is creating a new 4K page by storing to an old re-usable 4K I/O page since the store to the first cache line of a 4K page will require only a single system bus transaction to take the L1/L2 cache from a 'shared' state to a 'modified' state'. All other cache lines in the I/O page are left in the 'modified' state in the L1/L2 cache, so the processor stores to these cache lines can go directly into the L1/L2 cache requiring no system bus coherency traffic.

The present invention may be applied to systems where memory pages are accessed by different means. An additional embodiment of the present invention may be provided for a system that utilizes a Translation Control Entry (TCE) table in a PCI Host Bridge. A TCE table is usually provided in a PCI Host Bridge for use in accessing system memory above a set limit; for example four gigabytes (GB). In such a system, the TCE entry itself may be used as a trigger mechanism instead of using a first cache line in a 4K I/O page. In this instance, the PCI Host Bridge could perform ALL reads as 'Reads with no intent to cache' (no longer treated as special) and program logic invalidates a page by doing a store to the TCE entry that was used for the DMA read each time the page is being re-used (i.e., the PCI Host Bridge invalidates any data it fetched within a 4K page if the TCE it used to fetch the data was modified). As in the I/O page embodiment, system bus traffic is considerably reduced.

It is important to note that while the present invention has been described in the context of a fully functional device, those skilled in the art will appreciate that the mechanism of the present invention and/or aspects thereof are capable of being distributed in the form of a computer usable medium of instructions in a variety of forms, and that the present invention applies equally regardless of the particular type of signal bearing media used to actually carry out the distribution. Examples of computer usable media include:

nonvolatile, hard-coded type media such as read only memories (ROMs) or erasable, electrically programmable read only memories (EEPROMs), recordable type media such as floppy disks, hard disk drives and Compact Disk read only memories (CDROMs), and transmission type media such as digital and analog communication links.

While the invention has been particularly shown and described with reference to a preferred embodiment, it will be understood by those skilled in the art that various changes in form and detail may be made therein without departing from the spirit and scope of the invention.

What is claimed is:

1. A method for improving direct memory access and cache performance, comprising the steps of:

defining a memory buffer comprising a plurality of cache lines wherein a first cache line within said memory buffer is to be read as cacheable;

further defining remaining cache lines within said memory buffer as being in a modified state; and responsive to an attempt to change said first cache line from a shared state to a modified state, invalidating the entire memory buffer.

2. The method of claim 1, further comprising:

triggering a Peripheral Component Interconnect (PCI) host bridge to invalidate the entire memory buffer.

3. The method of claim 2, further comprising:

performing a store operation to said first cache line of said memory buffer.

4. An apparatus for improving direct memory access and cache performance, comprising:

a cache for storing information;

control logic for executing cache operations;

hardware for defining a memory buffer comprising a plurality of cache lines wherein a first line within said memory buffer is to be read as cacheable; and means for simultaneously invalidating all cache lines within the memory buffer responsive to an attempt to change the first cache line from a shared state to a modified state, without additional system bus commands.

5. The apparatus of claim 4, further comprising:

logic means within said control logic for triggering a Peripheral Component Interconnect (PCI) Host Bridge to invalidate the entire memory buffer.

6. The apparatus of claim 4, further comprising:

means within said control logic for performing a store operation to said first cache line of said memory buffer.

7. A computer program product having instructions within a computer readable medium for improving direct memory access and cache performance, comprising:

instructions within said computer readable medium for defining a page buffer comprising a plurality of cache lines wherein a first cache line within said page buffer is to be read as cacheable;

instructions within said computer readable medium for further defining remaining cache lines within said page buffer as being in a modified state; and responsive to an attempt to change said first cache line from a shared to a modified state, instructions within said computer readable medium for invalidating the entire page buffer.

8. The computer program product of claim 7, further comprising:

instructions within said computer readable medium for triggering a Peripheral Component Interconnect (PCI) Host Bridge to invalidate the entire page buffer.

9. The computer program product of claim 8, further comprising:

instructions within said computer readable medium for performing a store operation to said first cache line of said page buffer.

* * * * *